United States Patent [19]

Nakagawa et al.

[11] Patent Number: 5,754,317
[45] Date of Patent: May 19, 1998

[54] HOLOGRAPHIC STEREOGRAM BASED ON A COSINE TRANSFORM

[75] Inventors: Akira Nakagawa; Eishi Morimatsu; Makiko Konoshima; Kiichi Matsuda, all of Kawasaki, Japan

[73] Assignee: Fujitsu Limited, Kawasaki, Japan

[21] Appl. No.: 567,741

[22] Filed: Dec. 5, 1995

Related U.S. Application Data

[63] Continuation of Ser. No. 88,655, Jul. 9, 1993, abandoned.

[30] Foreign Application Priority Data

Sep. 30, 1992 [JP] Japan ................................. 4-262293

[51] Int. Cl.[6] .............................. G03H 1/08; G03H 1/26; G02B 27/22
[52] U.S. Cl. ................................... 359/9; 359/23; 359/29
[58] Field of Search ............................ 359/9, 23, 29

[56] References Cited

U.S. PATENT DOCUMENTS 4,701,006  10/1987  Perlmutter ........................... 350/3.66
4,778,262  10/1988  Haines ................................... 359/9
4,969,700  11/1990  Haines ................................... 359/9
5,194,971   3/1993  Haines ................................... 359/9

FOREIGN PATENT DOCUMENTS 1 278 672   6/1969   United Kingdom.
1 384 963   4/1972   United Kingdom.
WO 90/04218 4/1990   WIPO.

*Primary Examiner*—Jon W. Henry
*Attorney, Agent, or Firm*—Armstrong, Westerman, Hattori, McLeland & Naugton

[57] ABSTRACT

A holographic stereogram which includes a plurality of element holograms and which reproduces a stereoscopic image by irradiation of coherent light, wherein each element hologram is loaded with a modulation value (pattern) corresponding to the stereoscopic image, the modulation value being a one-dimensional or two-dimensional transform coefficient obtained by one-dimensional or two-dimensional cosine transform or discrete cosine transform of the distribution of the intensity of diffraction light expressing the stereoscopic image, enabling simplification of the drive system of the display device displaying the stereoscopic image and reproduction of the original stereoscopic image much more faithfully.

7 Claims, 14 Drawing Sheets

HOLOGRAPHIC STEREOGRAM BASED ON A COSINE TRANSFORM

This application is a continuation of application Ser. No. 08/088,655 filed Jul. 9, 1993, now abandoned.

BACKGROUND OF THE INVENTION

1. Field of the Invention

The present invention relates to a holographic stereogram. One of the technologies now being widely researched with the aim of visually reproducing stereoscopic images is holographic stereograms. Holographic stereograms are comprised of an array of a plurality of element holograms. Each of these element holograms is loaded with a unique modulation value corresponding to the stereoscopic image to be reproduced. By irradiating these element holograms with coherent light, the stereoscopic image is visually reproduced.

2. Description of the Related Art

As explained later in detail, the conventional methods for calculating the modulation values (pattern) to be loaded to the element holograms to realize a computer generated one-dimensional holographic stereogram are:

(a) The method using Fourier series expansion and (b) The method of using discrete Fourier transform by making discrete the distribution of intensity of diffraction light with respect to the angle (angle from the center of an element hologram to points in a block AB).

If finding the modulation values by the above-mentioned conventional methods by performing a Fourier transform or discrete Fourier transform, in general since the Fourier transform ($F(\omega)$) of $f(x)$ is expressed by $$F(\omega) = \frac{1}{\sqrt{2\pi}} \int_{-\infty}^{\infty} f(x) e^{-j\omega x} dx \quad (1)$$

not only the real component, but also the imaginary component appears. The same holds true for both one-dimensional and two-dimensional holographic stereograms.

Therefore, if trying to faithfully reproduce the distribution of intensity of diffraction light, it is necessary that the display device not only be able to perform modulation of the amplitude (amplitude modulation), but also be able to perform modulation of the index of refraction (phase modulation). Accordingly, there is the first problem that the drive system of the display device becomes complicated.

Further, in general, in a Fourier transform, it is known, the converted energy exists up to the higher order terms. As a result, there is the second problem that it becomes difficult to establish the condition (assumption) of the "point of sight being sufficiently far compared with the size of the element hologram" and therefore faithful reproduction of the distribution of intensity of diffraction light is inhibited.

SUMMARY OF THE INVENTION

Therefore, the present invention, in consideration of the above problems, has as its object the provision of a holographic stereogram which enables the drive system of the display device for visually reproducing the stereoscopic image to be simplified and which enables faithful reproduction of the distribution of intensity of diffraction light as in the original stereoscopic image.

To attain the above-mentioned object, the present invention provides a holographic stereogram which is comprised of an array of a plurality of element holograms and reproduces a stereoscopic image by irradiation of coherent light. The element holograms are loaded with modulation values (pattern) corresponding to the stereoscopic image. The modulation values are one-dimensional or two-dimensional transform coefficients obtained by one-dimensional or two-dimensional cosine transform or discrete cosine transform of the distribution of intensity of diffraction light expressing the stereoscopic image.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
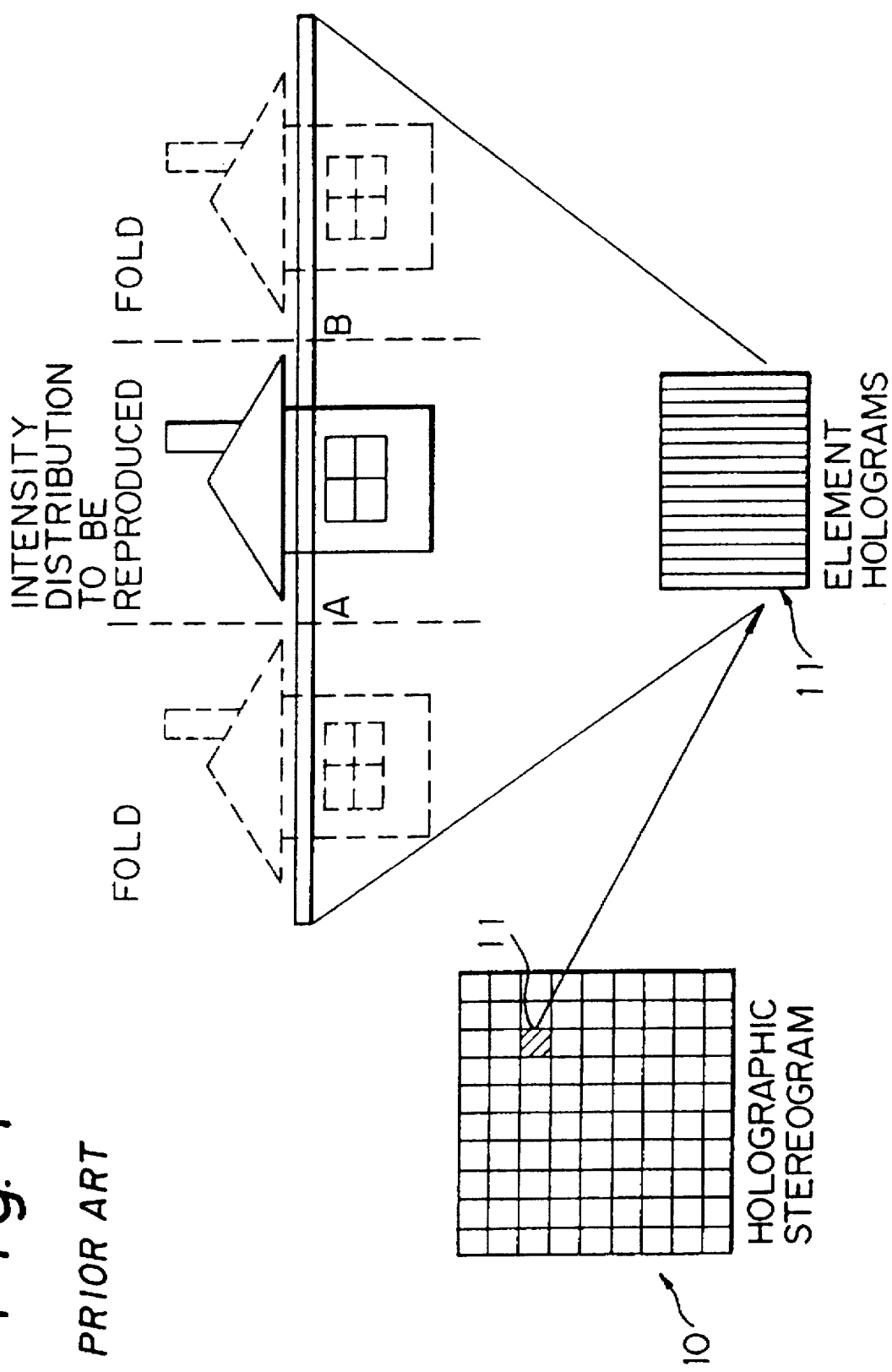
FIG. 1 is a view explaining a conventional computer-generated one-dimensional holographic stereogram.

FIG. 1 is a view explaining a conventional computer-generated one-dimensional holographic stereogram. In the figure, 10 is the holographic stereogram to be finally reproduced. It is comprised of an array of a plurality of element holograms 11. Each of the element holograms 11 is loaded with a unique modulation value corresponding to the stereoscopic image to be reproduced. Further, each of the element holograms 11 is divided into a plurality of cells.

According to the example shown in the figure, the stereoscopic image to be reproduced by the element hologram 11 is a house. The image shows the distribution of intensity of diffraction light.

The above-mentioned computer-generated one-dimensional holographic stereogram 10 is known as technique for obtaining a stereoscopic image by a simpler method than a usual hologram by omitting the three-dimensional effect in the vertical direction.

In a one-dimensional holographic stereogram, however, it is known that the pattern of an element hologram (modulation value to be loaded) is equal to the result of a Fourier transform applied to the distribution of intensity of diffraction light (image shown itself) in the horizontal direction (left-right in the figure) under the condition that the "point of sight is sufficiently far compared with the size of the element hologram". This will be clarified by, e.g., the description from page 16 to page 18 and with reference to FIG. 10.

As already mentioned, the conventional methods for calculating the modulation values (patterns) to be loaded to the element holograms 11 to realize a computer generated one-dimensional holographic stereogram 10 are:

(a) The method using Fourier series expansion and (b) The method of using discrete Fourier transform by making discrete the distribution of intensity of diffraction light with respect to the angle (angle from center of an element hologram to points in a block AB).

The concept of the use of the technique of the above (a) or (b) is illustrated in FIG. 1. With these techniques, the view scope is limited to the block AB shown, so as shown in FIG. 1, the actual distribution of intensity of diffraction light is periodic. The periodic distributions are usually called "folds" and are shown by the broken line images in the figure.

The distribution of the modulation values found by the technique of (a) or (b) (patterns of element holograms) is displayed on a display device able to spatially modulate the light intensity, such as a liquid crystal. In the case of (a), the one-dimensional Fourier series of the distribution of intensity of diffraction light of the block AB is loaded and the element hologram sought is formed. All the other element holograms are formed in the same way to give a computer-generated one-dimensional holographic stereogram. This above also applies to a computer-generated two-dimensional holographic stereogram.

Figure 2:
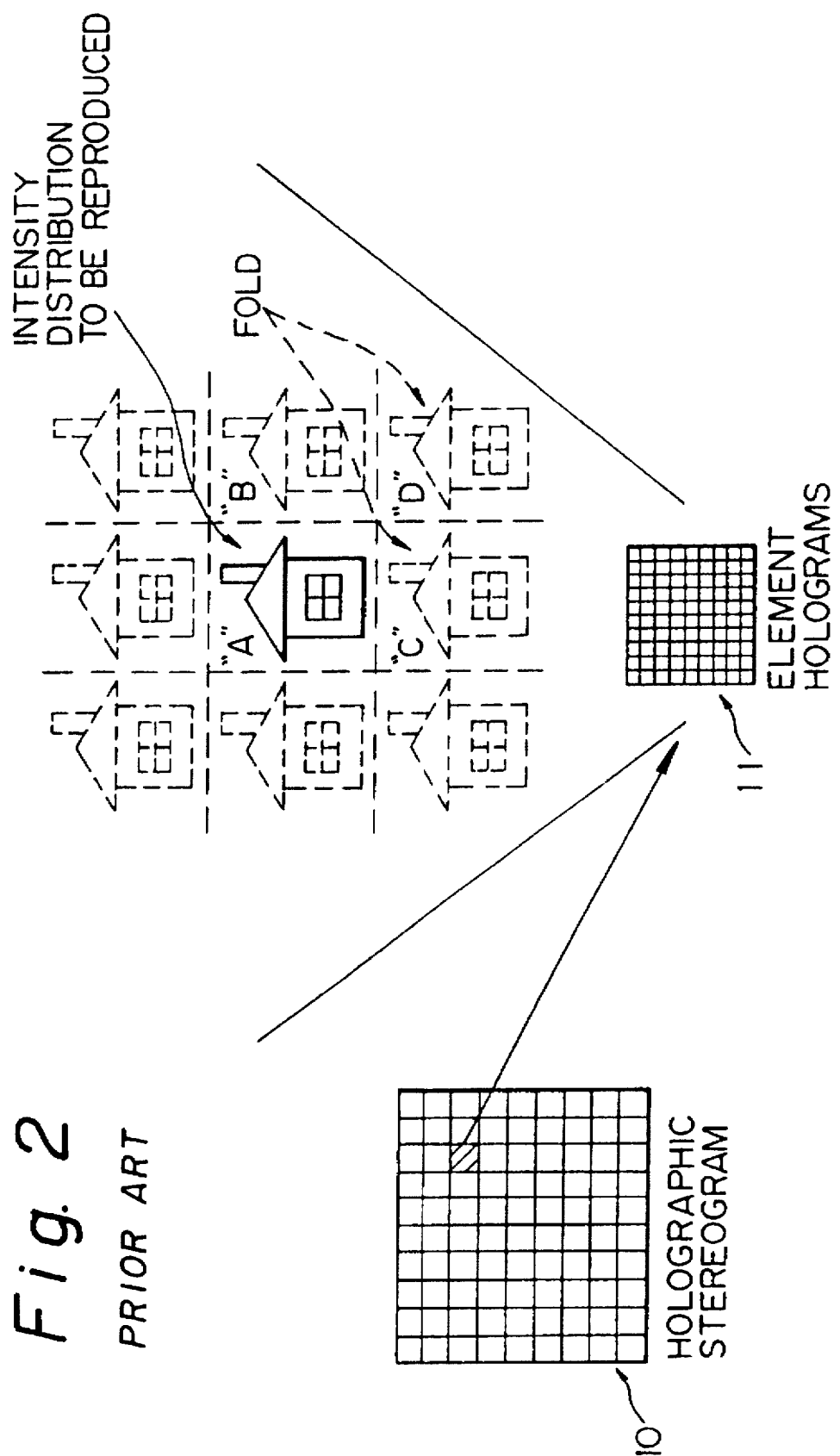
FIG. 2 is a view explaining a conventional computer-generated two-dimensional holographic stereogram.

FIG. 2 is a view explaining a conventional computer-generated two-dimensional holographic stereogram. A computer-generated two-dimensional holographic stereogram is known as a technique for obtaining a stereoscopic image by a simpler method than a real hologram in the same way as FIG. 1 since simple methods of calculation are known when using a computer.

Even in the case of a computer-generated two-dimensional holographic stereogram, the technique of (a) or (b) mentioned above is used. The Fourier transform is performed limiting the view scope to the area "A" shown in FIG. 2. Therefore, as shown in FIG. 2, the actual distribution of intensity of diffraction light which is reproduced becomes periodic (forms folds) in the same way as FIG. 1.

Further, in the same way as the case of FIG. 1, the distribution of modulation values found by the technique of (a) or (b) (patterns of element holograms) is expressed on a display device able to spatially modulate the light intensity, such as a liquid crystal. In the case of (a), the two-dimensional Fourier series of the distribution of the intensity of diffraction light desired to be reproduced at the area "A" is loaded and the element hologram sought is formed. All the other element holograms are formed in the same way to obtain a computer-generated two-dimensional holographic stereogram.

If finding the modulation values by the above-mentioned conventional methods by performing a Fourier transform or discrete Fourier transform, in general since the Fourier transform ($F(\omega)$) of $f(x)$ is expressed by the above-mentioned equation (1), not only the real component, but also the imaginary component appears. The same holds true for both one-dimensional and two-dimensional holographic stereograms.

Therefore, as mentioned earlier, the first and second problems occur.

Therefore, the present invention provides a holographic stereogram which enables the drive system of the display device for visually reproducing the stereoscopic image to be simplified and which enables faithful reproduction of the distribution of intensity of diffraction light as in the original stereoscopic image.

Figure 3:
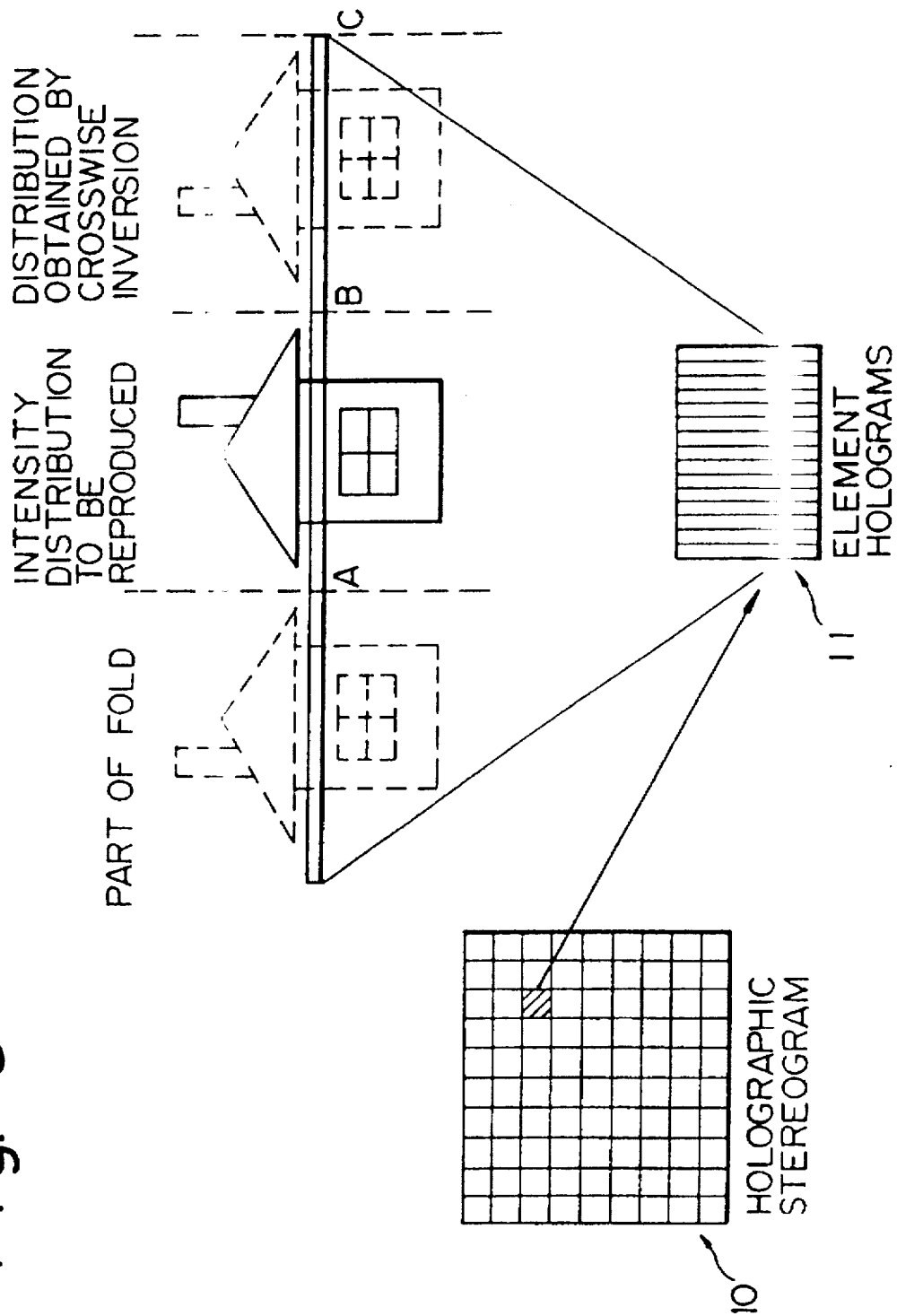
FIG. 3 is a view explaining a computer-generated one-dimensional holographic stereogram according to the present invention.
Figure 4:
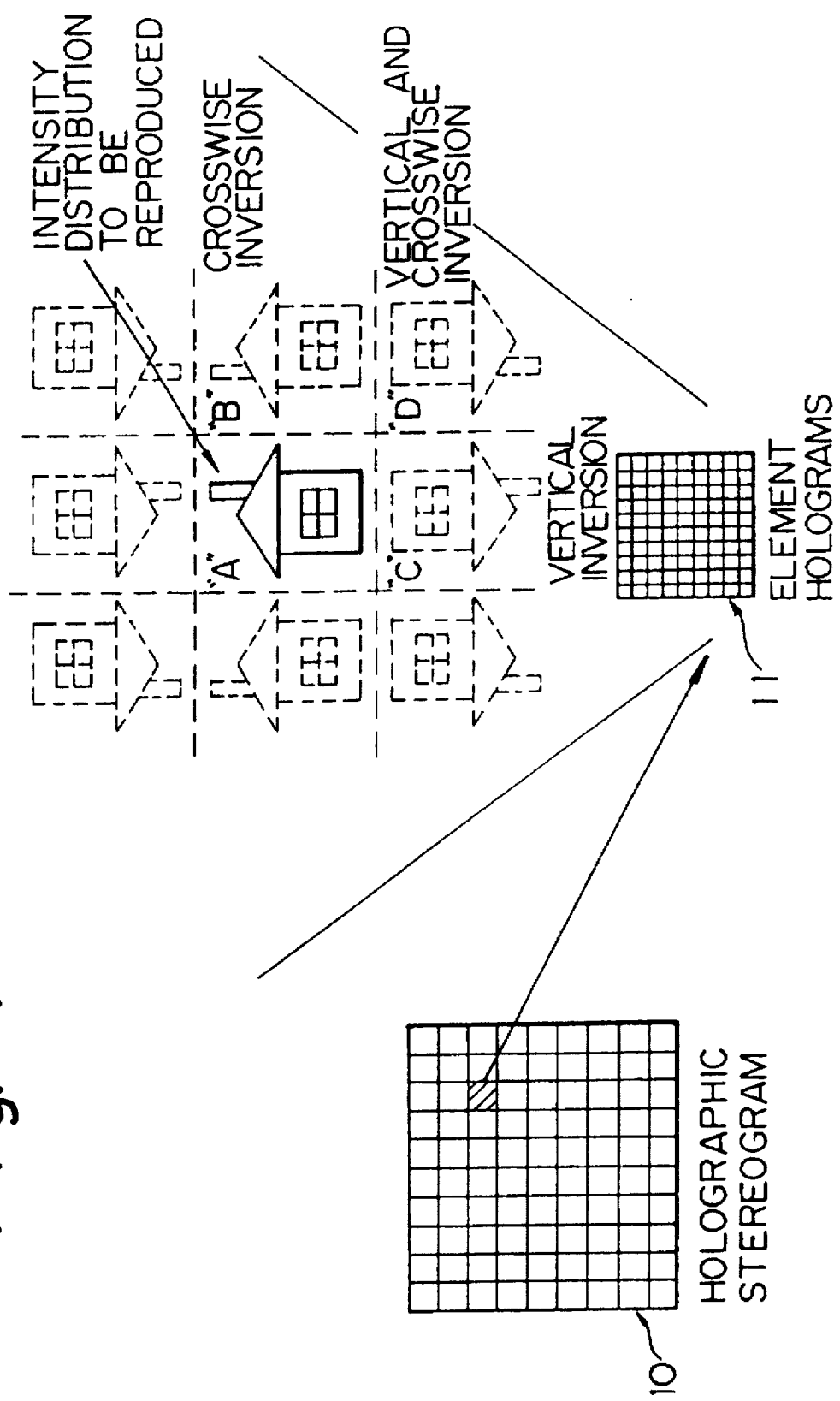
FIG. 4 is a view explaining a computer-generated two-dimensional holographic stereogram according to the present invention.

FIG. 3 is a view explaining a computer-generated one-dimensional holographic stereogram according to the present invention. Further, FIG. 4 is a view explaining a computer-generated two-dimensional holographic stereogram according to the present invention.

The present invention provides a holographic stereogram which is comprised of an array of a plurality of element holograms 11 each loaded with unique modulation values corresponding to the stereoscopic image to be reproduced and which reproduces a stereoscopic image by irradiation of the element holograms 11 with coherent light, wherein the element holograms are given modulation values by transform coefficients obtained by cosine transform or discrete cosine transform of the distribution of the intensity of diffraction light expressing the stereoscopic image to be reproduced.

More specifically, in the above-mentioned liquid crystal or other display device, the amplitude is changed in accordance with the modulation values in one-to-one correspondence with the element holograms 11 to form the element holograms. In FIG. 3, modulation values comprised of one-dimensional sine transform coefficients are loaded to the element holograms 11 and arrayed in one direction to realize a computer-generated one-dimensional holographic stereogram. In FIG. 4, modulation values comprised of two-dimensional cosine transform coefficients are loaded to the element holograms 11 and arrayed two-dimensionally to realize a computer-generated two-dimensional holographic stereogram.

Referring first to FIG. 3, the distribution of intensity of diffraction light desired to be reproduced exists in the block AB, but the block BC having a distribution of intensity of diffraction light which is virtually crosswise inverted ("distribution obtained by both crosswise inversion" in the figure) can be considered to be simultaneously reproduced with the block AB. That is, the block AC is formed as the hologram. To reproduce such a distribution of intensity of diffraction light, the modulation values (pattern) to be loaded in the element holograms 11 are obtained by performing a Fourier series expansion or a discrete Fourier transform on the distribution of intensity of diffraction light present in the block AB.

There is no sine component, however, in the modulation value of the block AC obtained here. The reason is that, in FIG. 3, the distribution of the block AC is inverted crosswise and inverted in intensity about the point B. The distribution of the block AC becomes an even function, so the sine component in the above-mentioned $e^{jxt}$ (=cosxt+jsinxt) disappears.

In the end, the Fourier transform on the distribution of intensity in the block AC becomes equivalent to a cosine transform or discrete cosine transform of the distribution of intensity in the block AB. In this case, a distribution obtained by both crosswise inversion is virtually introduced as the distribution of the block BC, but this block BC is outside the view scope of the block AB and therefore there is no problem with the introduction of the block BC.

In the above-mentioned cosine transform and discrete cosine transform, all the transform coefficients (modulation values to be loaded) are real numbers. Therefore, when realizing a display device, it is sufficient to modulate only the amplitude and the drive system of the display device is simplified. In general, when considering the vector cosθ+ jsinθ, unless both the cosθ component and the sinθ component are 0, the phase component (θ) expressed by tanθ (=sinθ/cosθ) appears, so at this time it is necessary to consider not only modulation of the amplitude, but also the modulation of the phase (index of refraction). Since as mentioned above, however, the sine component is 0, it is sufficient to find the modulation value for only the amplitude.

The above-mentioned cosine transform and discrete cosine transform correspond to the generally known orthogonal transform in image processing techniques and therefore it can be easily understood that the above-mentioned transform coefficients concentrate at the lower order terms. As a result, the afore-mentioned condition (assumption) that the "point of sight is sufficiently far compared with the size of the element hologram" can be sufficiently satisfied and faithful reproduction of the distribution of intensity of diffraction light becomes possible.

The above applies to the computer-generated two-dimensional holographic stereogram shown in FIG. 4 as well.

Referring first to FIG. 4, the distribution of the intensity of diffraction light desired to be reproduced exists in the area "A", but the areas "B", "C", and "D" having distributions of intensity of diffraction light obtained virtually by vertical and crosswise inversion ("crosswise inversion", "vertical and crosswise inversion", and "vertical inversion" in the figure) can be considered to be simultaneously reproduced with the area "A". That is, the areas "A", "B", "C", and "D" are formed as holograms. To reproduce such a distribution of intensity of diffraction light, the modulation values (pattern) to be loaded in the element holograms 11 are obtained by performing a two-dimensional Fourier series expansion or two-dimensional discrete Fourier transform on the distribution of intensity of diffraction light present in the areas "A", "B", "C", and "D" according to the previously mentioned conventional techniques.

There is no sine component, however, in the modulation value of the areas "A", "B", "C", and "D" obtained here.

In the end, the Fourier transform on the distribution of intensity in the areas "A" to "D" becomes equivalent to a two-dimensional cosine transform or two-dimensional discrete cosine transform of the distribution of intensity of the area "A". In this case, a distribution obtained by vertical and crosswise inversion is virtually introduced as the distribution of the areas "B", "C", and "D", but the areas "B", "C", and "D" are outside the view scope of the area "A" and therefore there is no problem with the introduction of the areas "B", "C", and "D".

In the above-mentioned two-dimensional cosine transform and two-dimensional discrete cosine transform, all the two-dimensional transform coefficients (modulation values to be loaded) are real numbers. Therefore, when realizing a display device, it is sufficient to modulate only the amplitude and the drive system of the display device is simplified.

Further, the above-mentioned two-dimensional cosine transform and two-dimensional discrete cosine transform correspond to the generally known orthogonal transform in image processing techniques and therefore it can be easily understood that the above-mentioned two-dimensional transform coefficients concentrate at the lower order terms. As a result, the afore-mentioned condition (assumption) that the "point of sight is sufficiently far compared with the size of the element hologram" can be sufficiently satisfied and faithful reproduction of the distribution of intensity of diffraction light becomes possible.

Figure 5:
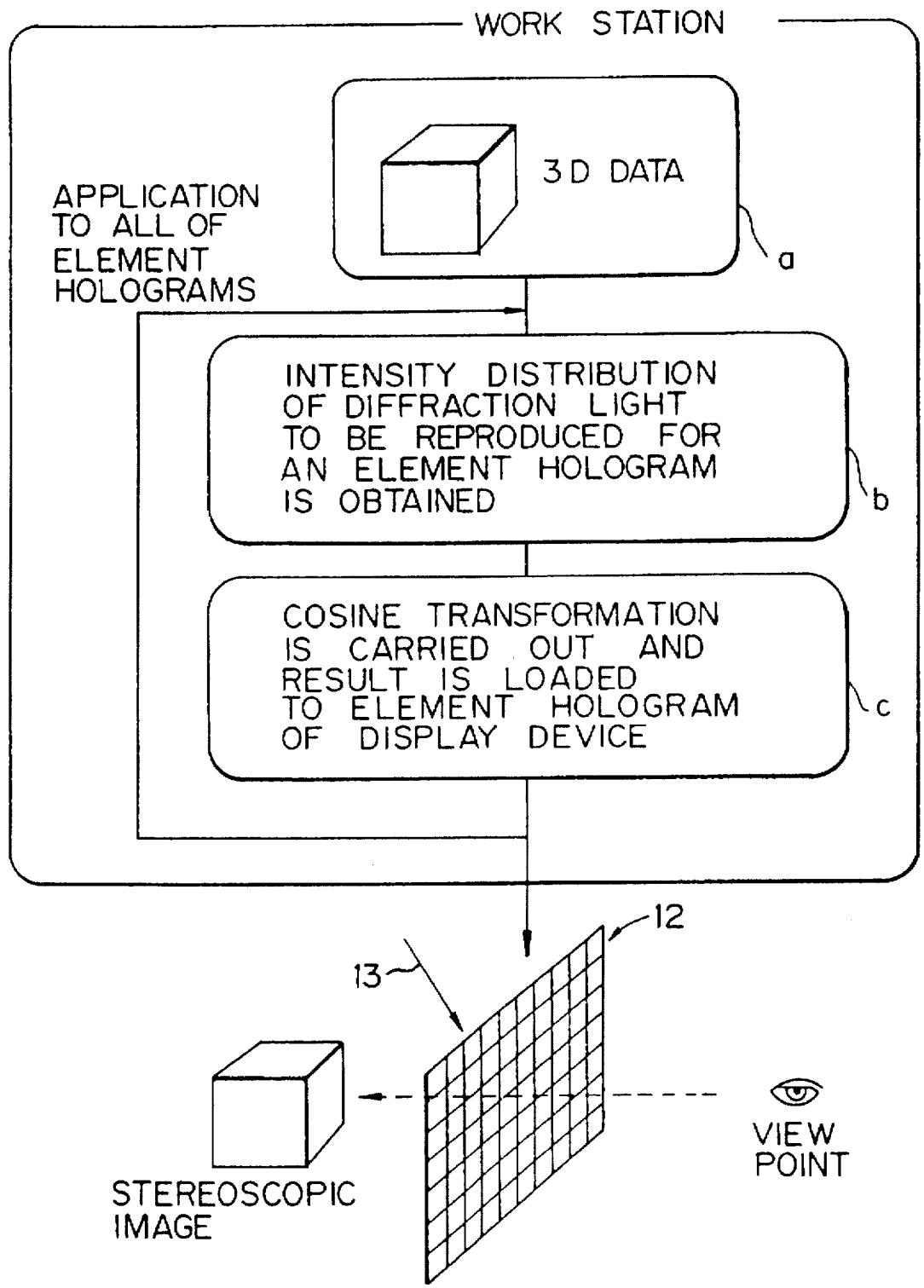
FIG. 5 is a view showing an embodiment of a routine for producing a holographic stereogram according to the present invention.

FIG. 5 is a view showing an embodiment of a routine for producing a holographic stereogram according to the present invention. Note that the embodiment in this figure may be applied to both computer-generated one-dimensional holographic stereograms and computer-generated two-dimensional holographic stereograms. In this embodiment, CAD data is displayed as a stereoscopic image using a work station. The CAD data is three-dimensional data showing the three-dimensional coordinates of the stereoscopic image. This is shown as "3D data" in block a in the figure.

Next, the distribution of intensity of diffraction light which an element hologram 11 is to reproduce (corresponding to the image of a house shown in FIG. 3 or FIG. 4) is found. This is shown by the block b in the figure. Note that the steps up to here are the same as those performed in the past.

The characterizing feature of the present invention is shown in block c. Here, a cosine transform is performed on the distribution of intensity of diffraction light. The resultant one-dimensional or two-dimensional transform coefficient is loaded in the element hologram as the modulation value.

For example, in a display device 12 formed by a liquid crystal, the modulation values corresponding to the element holograms are loaded to obtain a desired pattern. By irradiating coherent light (reproducing light) to the thus realized display device 12, it is possible to view a stereoscopic image specified by the 3D data.

FIG. 5 shows an example of the technique for loading the one-dimensional or two-dimensional transform coefficients (modulation values) obtained by performing a cosine transform in the display device 12 corresponding to the element holograms.

That is, if the number of samples per element hologram 11 is N (N is a positive number), the cosine transform coefficients are loaded at 2N points. Here the corresponding cosine transform coefficients are loaded as will be explained with reference to FIGS. 6 and 7.

Figure 6:
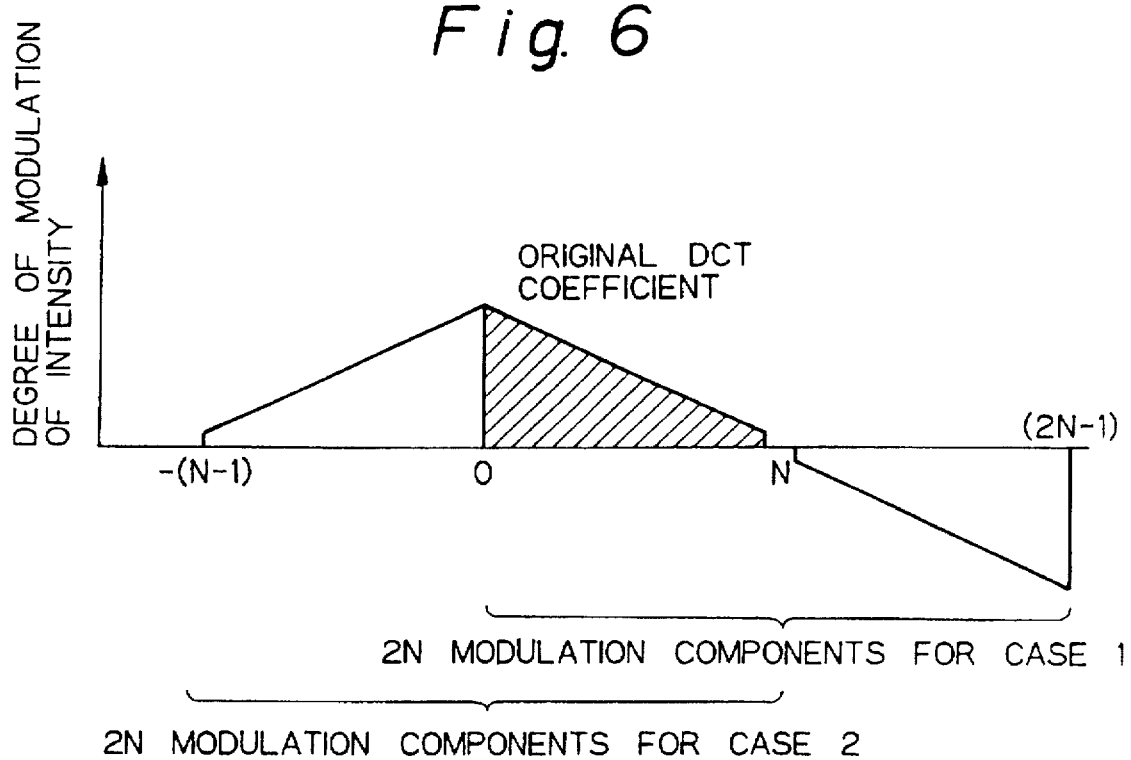
FIG. 6 is a view showing the method of loading sine transform coefficients in a display device.
Figure 7:
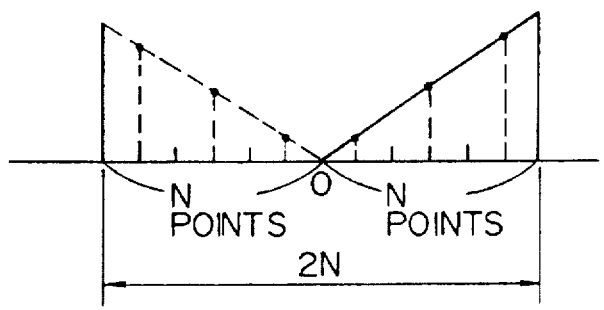
FIG. 7 is a view mathematically explaining a discrete cosine transform on 2N number of samples.

FIG. 6 is a view showing the method of loading cosine transform coefficients in a display device. FIG. 7 is a view mathematically explaining a discrete cosine transform on a 2N number of samples. Generally speaking, if the number of samples for each of the element holograms is N (N being a positive integer), an N number of the cosine transform coefficients and another N number of cosine transform coefficients which are obtained by rearranging or inverting the cosine transform coefficients are both produced over 2N modulation components and are loaded on the display device. In this case, although the explanation is given with reference to a one-dimensional holographic stereogram, the same also applies to a two-dimensional holographic stereogram. In the latter case, the 2N modulation components are adopted in not only an X axis, but also a Y axis, the X–Y axes defining the two-dimensional hologram (2N×2N).

A loading of the coefficients of the holographic stereogram by using a discrete cosine transform will be explained below.

A function $f_n$ (n=0 to N−1) on each point N along a space axis is subjected to a discrete cosine transform to obtain the following function $F_k$, where the function $f_n$ represents an actual image to be reproduced.

$$F_k = \sum_{n=0}^{N-1} f_n(e^{j2\pi/2N \cdot (n+1/2)k} + e^{-j2\pi/2N \cdot (n+1/2)k}) \quad (2)$$

$$= 2\sum_{n=0}^{N-1} f_n \cos(\pi/N \cdot (n+1/2)k) \quad (3)$$

The equation (2) is expressed in the form of a Fourier transform. The equation (3) expresses a definition of a discrete cosine transform.

For an actual display of an image to be reproduced, it is necessary to load the 2N points of the coefficients on the display device 12. This will be explained by taking two cases, i.e., a Case 1 and a Case 2, as examples.

Case 1

2N points, i.e., $F_0$ to $F_{2N-1}$ are loaded on the display device by taking k=0 to N to 2N−1 (refer to FIG. 6).

When 2N−1 ≤ k ≤ N, k' is defined as k'=2N−k.

The equation is rewritten as k=2N−k'. This is substituted in the above equation (2) to obtain the following equations.

$$\begin{aligned}
F_k &= F_{2N-k'} \\
&= 2\sum_{n=0}^{N-1} f_n \cdot \cos\left(\frac{\pi}{N} \cdot \left(n + \frac{1}{2}\right)(2N - k')\right) \\
&= 2\sum_{n=0}^{N-1} f_n \cdot \cos\left(\pi(2n+1) - \frac{\pi}{N} \cdot \left(n + \frac{1}{2}\right)k'\right) \\
&= -2\sum_{n=0}^{N-1} f_n \cdot \cos\left(\frac{\pi}{N} \cdot \left(n + \frac{1}{2}\right)k'\right) \\
&= -F_{k'} \\
&= -F_{2N-k}
\end{aligned}$$

Figure 8:
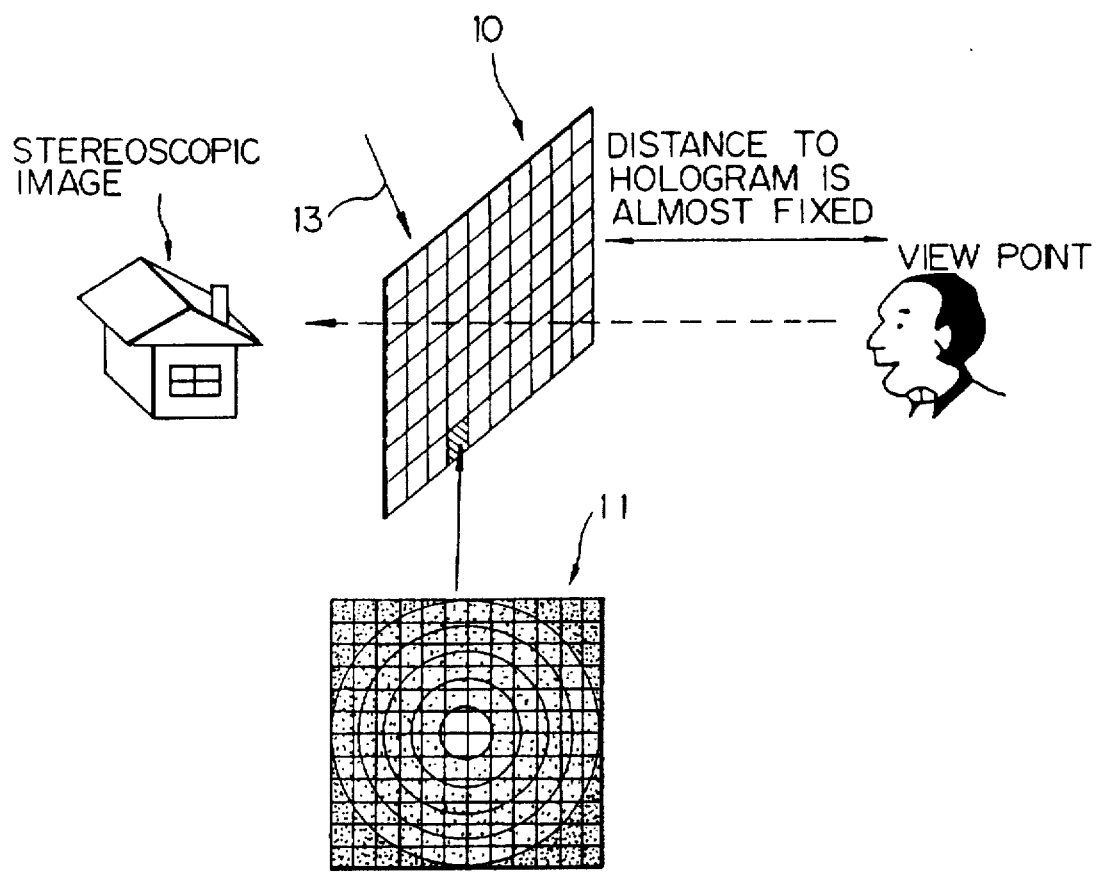
FIG. 8 is a view showing the state of application of compensation of the degree of modulation of the index of refraction for an element hologram.

The above 2N points are loaded on the display device 12. If the thus loaded display device 12 is illuminated by a light 13 as shown in FIG. 8, a light intensity at a point m on a space on which the image is to be displayed (refer to FIG. 10), can be calculated as follows.

$$\sum_{k=0}^{2N-1} \alpha e^{j\pi/N \cdot (m+1/2)k} \cdot F_k$$

In the above expression, the first term "$\alpha e^{j\pi/N \cdot (m+1/2)k}$" represents a wavefront reached at the point m on the display space, when the light is illuminated on the display device at the point k. While, the second term "$F_k$" represents a degree of the modulation at the point k on the display device.

The above expression $$\sum_{k=0}^{2N-1} \alpha e^{j\pi/N \cdot (m+1/2)k} \cdot F_k$$

can be rewritten as $$\alpha F_0 + \alpha F_N + \sum_{k=1}^{N-1} \alpha e^{j\pi/N \cdot (m+1/2)k} \cdot F_k + \sum_{k=N+1}^{2N-1} \alpha e^{j\pi/N \cdot (m+1/2)k} \cdot F_k$$

In the above expression, since $F_N=0$ ($F_N=-F_{2N-N}=-F_N$) and $$e^{j\pi/N \cdot (m+1/2)(2N-k)} = -e^{-j\pi/N \cdot (m+1/2)k}$$

and the relationship $F_k = -F_{2N-k}$ stands, so that expression can be rewritten as follows.

$$2N\alpha \left\{ 1/N \cdot \left( 1/2 \cdot F_0 + \sum_{k=0}^{N-1} F_k \cos(\pi/N \cdot (m+1/2)k) \right) \right\}$$

In the above expression, the term $$\text{"}1/N \cdot \left( 1/2 \cdot F_0 + \sum_{k=0}^{N-1} F_k \cos(\pi/N \cdot (m+1/2)k) \right)\text{"}$$

represents an inverse discrete cosine transform which produces the original image, at the point m i.e., $f_m$. Therefore, the following relationship stands $$2N\alpha \cdot f_m \propto f_m$$

That is, the resultant $2N\alpha \cdot f_m$ is proportional to the intensity of the image to be reproduced.

In the above Case 1, the N discrete cosine transform coefficients are developed over 2N points as indicated by "2N Modulation Components for Case 1" in FIG. 6.

Case 2

The loading method of the Case 2 is different from that of the Case 1. In the Case 2, 2N points are selected by taking k=−(N−1) to (N−1).

For k=−(N−1) to −1, the above equation (3) is expressed as follows.

$$\begin{aligned}
F_{-k} &= 2\sum_{n=0}^{N-1} f_n \cos(\pi/N \cdot (n+1/2)(-k)) \\
&= 2\sum_{n=0}^{N-1} f_n \cos(\pi/N \cdot (n+1/2)k) \\
&= F_k
\end{aligned}$$

The above 2N points are loaded on the display device 12. If the thus loaded display device 12 is illuminated by a light 13 as shown in FIG. 8, a light intensity at a point m in a space on which the image is to be displayed (refer to FIG. 10), can be calculated as follows.

$$\sum_{k=-(N-1)}^{N-1} \alpha e^{j\pi/N \cdot (m+1/2)k} \cdot F_k = \alpha F_0 + \sum_{k=-(N-1)}^{N-1} \alpha e^{j\pi/N \cdot (m+1/2)k} \cdot F_k +$$

$$\sum_{k=1}^{N-1} \alpha e^{j\pi/N \cdot (m+1/2)k} \cdot F_k$$

$$= \alpha F_0 + 2\alpha \sum_{k=1}^{N-1} F_k \cdot \cos(\pi/N \cdot (m+1/2)k)$$

$$= 2N\alpha \left\{ 1/N \cdot \left( 1/2 \cdot F_0 + \sum_{k=1}^{N-1} F_k \cos(\pi/N \cdot (m+1/2)k) \right) \right\}$$

In the above equation, the term $$\text{``}1/N \cdot \left( 1/2 \cdot F_0 + \sum_{k=1}^{N-1} F_k \cos(\pi/N \cdot (m+1/2)k) \right)\text{''}$$

represents an inverse discrete cosine transform which produces the original image at the point m, i.e., $f_m$. Therefore, the following relationship stands, $$2N\alpha f_m \propto f_m$$

That is, the resultant $2N\alpha f_m$ is proportional to the intensity of the image to be reproduced.

In the above Case 2, the N discrete cosine transform coefficients are developed over 2N points as indicated by "2N Modulation Components for Case 2" in FIG. 6.

As mentioned above, a holographic stereogram requires that the condition that the "point of sight is sufficiently far compared with the size of the element hologram" stand. Therefore, when this condition does not stand, the desired distribution of intensity of diffraction light cannot be obtained. Specifically, the high frequency component of the distribution of intensity of diffraction light is lost and the distribution becomes blurred.

Therefore, for the element holograms to reproduce the distribution of intensity of diffraction light as desired, in the present invention, further, (i) compensation is applied in each element hologram so that the degree of modulation of the index of refraction gradually changes along with the increase in distance from the center and (ii) the amount of composition is revised in accordance with the variation in the distance between the element hologram and the point of sight.

Figure 9:
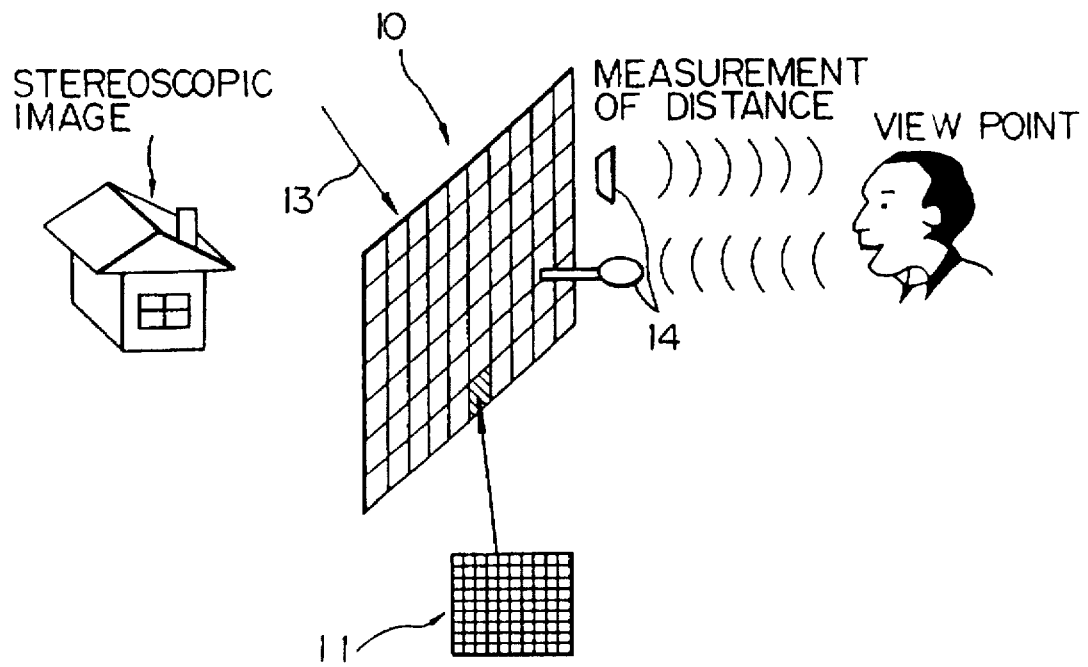
FIG. 9 is a view showing the application of revision to the amount of compensation in accordance with variations in the distance between the element hologram and the point of sight.

FIG. 8 is a view showing the state of application of compensation of the degree of modulation of the index of refraction for an element hologram, while FIG. 9 is a view showing the application of revision to the amount of compensation in accordance with variations in the distance between the element hologram and the point of sight. FIG. 8 corresponds to the above-mentioned (i) while FIG. 9 corresponds to the above-mentioned (ii).

As mentioned above, by revising the degree of modulation at each element hologram by a value depending on the distance from the center of the element hologram to the point where a transform is performed on the actually incident coherent light 13 and the distance from the element hologram to the point of sight (view point), it is possible to realize a holographic stereogram which enables faithful reproduction of the distribution of intensity of diffraction light up to the high frequency component.

First, the value for modulating the incident coherent light is shifted from the value found by performing a Fourier transform (same even with cosine transform) on the points of the element hologram by exactly the multiple of $$\exp(jkx^2/2L)$$

where, j: complex unit x: distance of coefficient from center of element hologram k: number of waves of incident coherent light L: distance from element hologram to point of sight This is explained below.

Figure 10:
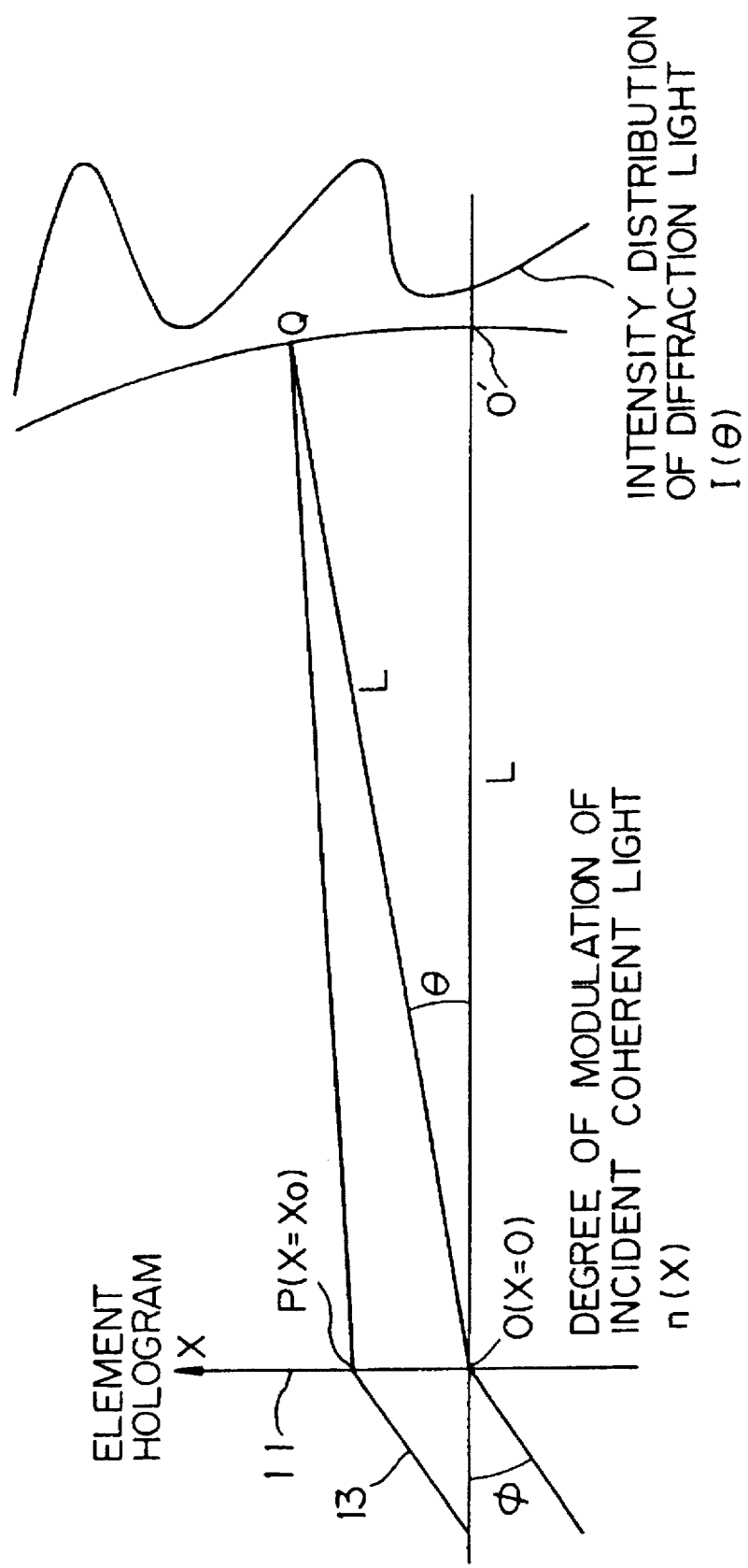
FIG. 10 is a view explaining the compensation of the degree of modulation of the index of refraction.

FIG. 10 is a view explaining the compensation of the degree of modulation of the index of refraction.

Consider the element hologram 11 of the holographic stereogram shown in FIG. 10. The angle of incidence of the coherent light to the element hologram 11 is $\phi$. Consider that the distribution (n(x)) of degree of light modulation of the element hologram causes diffraction with the distribution of light intensity of $I(\theta)$ on a circular screen exactly a distance L from the center O of the element hologram.

Here, the light path difference at a point Q ($\theta=\theta_0$) on the circular screen in the case of light diffracted at the point O (x=0) and the point P ($x=x_0$) is found.

First, the light path difference $l_1$ of the light 13 incident at the point O and the point P becomes $$l_1 = x_0 \cdot \sin\theta$$

Further, the light path difference $l_2$ of (OQ-PQ) is $$\begin{aligned} l_2 &= OQ - PQ \\ &= L - (L^2 + x_0^2 - 2x_0 \cdot L \cdot \sin\theta_0)^{1/2} \\ &\approx x_0 \cdot \sin\theta_0 - x_0^2/2L \end{aligned}$$

therefore, the total light path difference l becomes $$\begin{aligned} l &= l_1 - l_2 \\ &= x_0 \cdot \sin\phi - x_0 \cdot \sin\theta_0 + x_0^2/2L \end{aligned}$$

From this, the light intensity measured at the point Q becomes as follows by using k as the wave number of the incident coherent light and integrating the light from the entire surface of the element hologram 11:

$$\begin{aligned} I(\theta_0) &= \int n(x) \cdot \exp(-jk(x \cdot \sin\phi - x \cdot \sin\theta_0 + x^2/2L)) \cdot dx \\ &= \int n(x) \cdot \exp(-jkx^2/2L) \cdot \exp(-jk(\sin\phi - \sin\theta_0)x) \cdot dx \end{aligned}$$

Here, if the following variable transform is performed:

$$\Xi = \sin\phi - \sin\theta_0$$

then $$I(\Xi) = \int n(x) \cdot exp(-jkx^2/2L) \cdot exp(-jk\Xi x) \cdot dx$$

and it is learned that $I(\Xi)$ becomes the inverse Fourier transform of $n(x) \cdot exp(-jkx^2/2L)$. From this, the term $n(x) \cdot exp(-jkx^2/2L)$ is the Fourier transform of $I(\Xi)$. That is, $$n(x) \cdot exp(-jkx^2/2L) \propto \int I(\Xi) \cdot exp(jk\Xi x) \cdot d\Xi$$

From the above, the distribution of the degree of modulation of light intensity of the element hologram for reproducing the desired distribution of intensity of diffraction light becomes $$\underbrace{n(x) \propto exp(jkx^2/2L)}_{\text{Compensation}} \cdot \underbrace{\int I(\Xi) \cdot exp(jk\Xi x) \cdot d\Xi}_{\substack{\text{Fourier transform of desired}\\\text{distribution of intensity of}\\\text{diffraction light}}}$$

The compensation term is multiplied with the Fourier transform (same for cosine transform) of the desired distribution of intensity of diffraction light. Note that the above discussion stands similarly in both the one-dimensional and two-dimensional cases.

As seen in the above final equation, the value of the compensation term depends only on the distance x from the center of the element hologram and the distance L from the center of the element hologram to the point of sight (view point) and is not dependent on the viewing angle θ. This fact is true in the case of using a two-dimensional Fourier transform (two-dimensional cosine transform) as well. Further, this compensation value is only the phase component. This means that in actuality it is sufficient to change only the light path difference in the display device 12, that is, the index of refraction. From this, to reproduce the desired distribution of intensity of diffraction light, it is sufficient to apply the following compensation.

First, consider the case where the position of the point of sight of the observer from the hologram is substantially constant. In this case, in the above-mentioned compensation term, L is substantially fixed, so the compensation term depends on only the value from the center of the element hologram. That is, it can be calculated in advance. Therefore, it is possible to either change the index of refraction by exactly the light path difference with respect to the calculated modulation value or to install in the display device 12 from the start an index of refraction which realizes this light path difference (FIG. 8).

Further, when the point of sight of the observer changes, it is possible to use an ultrasonic sensor 14 etc. and measure the distance from the hologram (10) to the observer's head, calculate a compensation value calculated in accordance with this distance, and multiply it with the value found by the Fourier transform (FIG. 9).

Using the above method, it is possible to obtain the desired distribution of intensity of diffraction light and it is possible to realize a holographic stereogram which can be faithfully reproduced up to the high frequency components.

Specific numerical examples follow:

Distance to point of sight: $L=300$ mm$=3.00 \times 10^{-1}$m
Wavelength of incident light: $\lambda=633$ nm$=6.33 \times 10^{-7}$m
Wave number: $k=2\pi/\lambda=9.93 \times 10^6$ rad/m In this case, the compensation term becomes:

$$exp\left(jk\frac{x^2}{2L}\right) = exp(j \times 1.65 \times 10^7 \times x^2) \tag{4}$$

From the above, if the distance (μm) from the center o the element hologram is made x, then the distribution n(x) of the index of refraction to actually perform the compensation becomes the following if the thickness Δ of the variable portion of the index of refraction is 2 μm:

$$n(x) = \frac{\lambda}{\Delta} \cdot \frac{1.65 \times 10^7 \times x^2}{2\pi} \tag{5}$$

$$= 0.317 \cdot \left(\frac{x}{6.17 \times 10^{-4}}\right)^2$$

In actuality, it is sufficient if the phase can be changed from 0 to $2\pi$, so the index of refraction becomes:

$$n(x) = 0.317 \cdot frac\left(\left(\frac{x}{6.17 \times 10^{-4}}\right)^2\right)$$

(where, frac (a) is a function returning the decimal fraction portion of a).

Compensation is performed in accordance with this equation by applying the concentric circular distribution of index of refraction shown in FIG. 8 to the display device 12.

The above compensation enables the prevention of blurring of the distribution of intensity of diffraction light, that is, the reduction of quality of the stereoscopic image reproduced. From viewpoint of the quality of the stereoscopic image reproduced, there is further the problem of the distortion of the stereoscopic image. Distortion of the stereoscopic image is caused when the coherent light (reproducing light) is made incident on the hologram from a direction different from the other coherent light (reference light). This is itself known. Below, a detailed explanation will be made of the compensation for distortion of the stereoscopic image.

Figure 11:
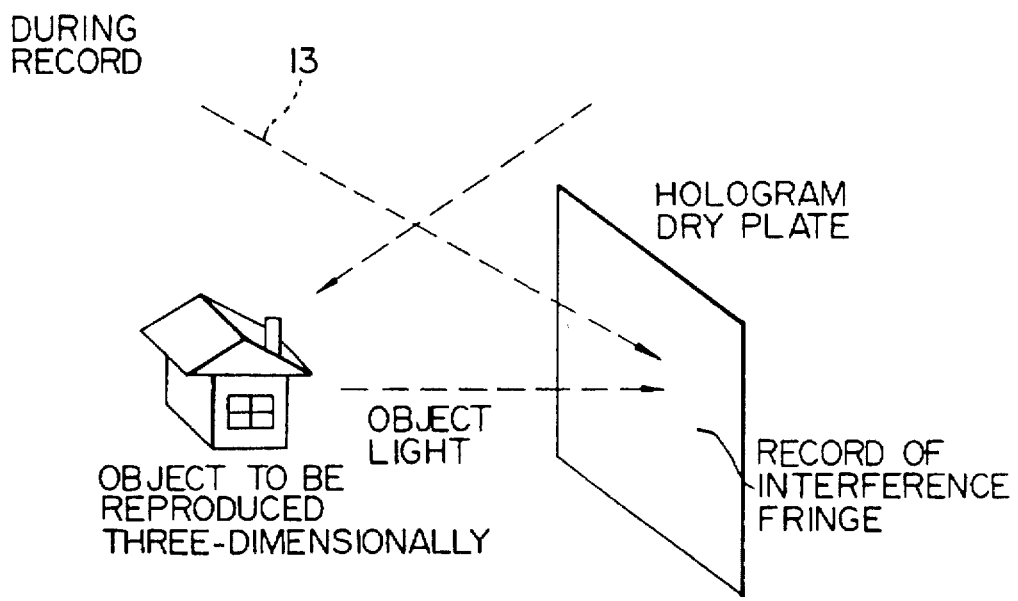
FIG. 11 is a view showing the state of recording of a general hologram.
Figure 12:
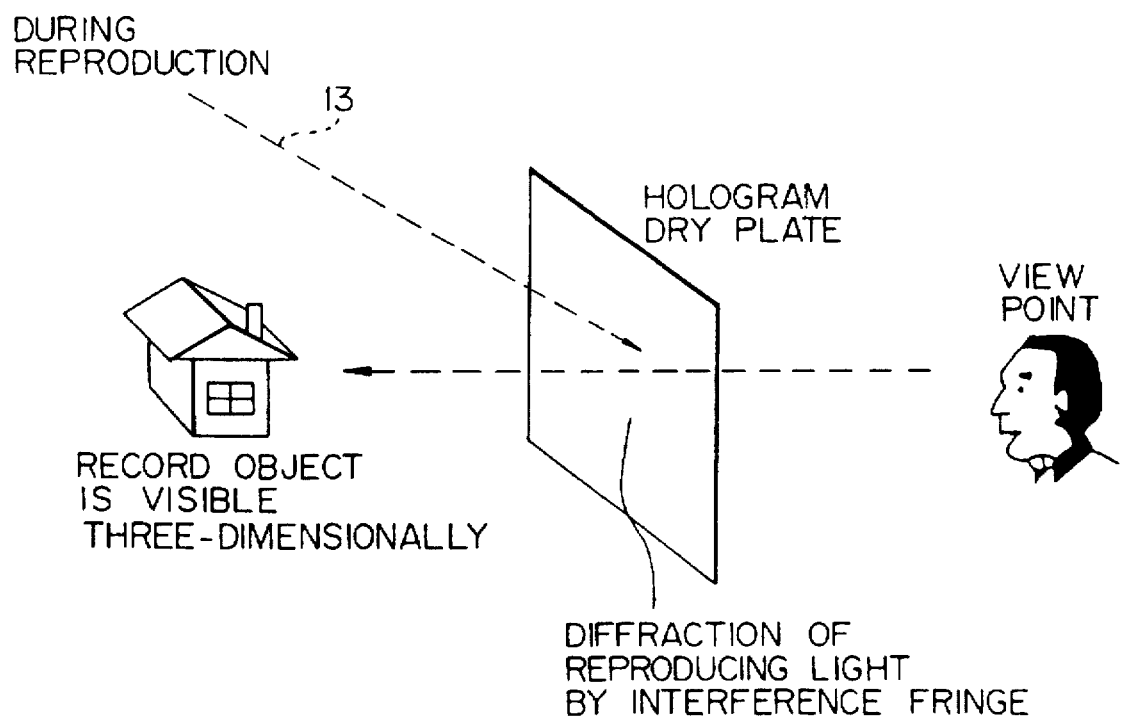
FIG. 12 is a view showing the state of reproduction of a general hologram.

FIG. 11 is a view showing the state of recording of a general hologram, while FIG. 12 is a view showing the state of reproduction of a general hologram.

In a computer-generated holographic stereogram, during recording of the hologram, the interference fringe formed between the object light and the assumed reference light is calculated. On the other hand, at the time of reproduction, if reproducing light is made incident on the hologram from the same direction as the assumed reference light, the light is diffracted by the interference fringe and a stereoscopic image is reproduced.

If the reproducing light is made incident from a direction different from the reference light, as mentioned earlier, the reproduced stereoscopic image becomes distorted. In the past, to reproduce a stereoscope image from a hologram or holographic stereogram using reproducing light from various different directions, it had been necessary to make holograms or holographic stereograms calculated with the different dirctions of reference light for each angle of incidence of light. Further, in a holographic stereogram using Fourier transforms (including cosine transforms and sine transforms), there were the defects that the area (spatial area) to be subjected to the Fourier transform was made larger to protect the eye from the reproducing light and that it was necessary to perform a Fourier transform etc. even on the portions not actually requiring it since the distribution of diffraction light was distributed about the light axis and thus the spatial frequency pitch ended up finer.

Figure 13:
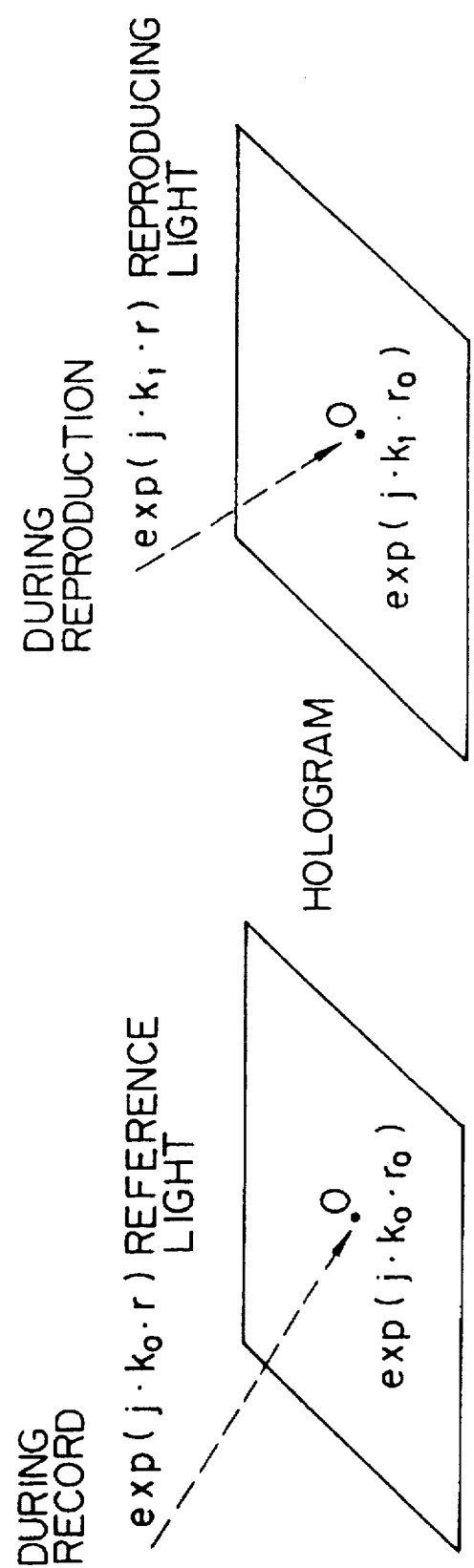
FIG. 13 is a view showing the difference in direction of incident light at the time of recording and reproduction.

FIG. 13 is a view showing the difference in direction of incident light at the time of recording and reproduction. As shown in the figure, when the direction of incidence light differs during recording and reproduction, if $K_0$ is the wave number vector of the reference plane light at the time of recording, $K_1$ is the wave number vector of the reproducing plane light, and $\gamma_o$ is the coordinate vector for the point O on the hologram, the distribution of light reaching the surface of the hologram at the time of recordal is expressed by $$\exp(j \cdot K_0 \cdot \gamma_o) \quad (6)$$

Further, the distribution of the light reaching the surface of the hologram at the time of reproduction is expressed by $$\exp(j \cdot K_1 \cdot \gamma_o) \quad (7)$$

In this way, the phase distribution of the light incident on the hologram differs at the time of recordal and the time of reproduction.

To enable distortion free reproduction of the same stereoscopic image as at the time of recordal even with recording light incident from a different direction, one may reproduce on the surface of the hologram the same phase distribution of incident light as at the time of recordal at the time of reproduction. Toward this end, the reproducing light is modulated on the surface of the hologram so as to enable realization of the same phase distribution as of the incident light. Specifically, if the reproducing light incident on the hologram is modulated as to its phase component as $$\exp(j \cdot (K_0 - K_1) \cdot \gamma_o) \quad (8)$$

the phase component of the modulated reproducing light becomes $$\underbrace{\frac{\exp(j \cdot K_1 \cdot \gamma_o)}{\text{Reproducing light}}} \times \underbrace{\frac{\exp(j \cdot (K_0 - K_1) \cdot \gamma_o)}{\text{Modulation on hologram}}} = \underbrace{\frac{\exp(j \cdot K_0 \cdot \gamma_o)}{\text{Distribution equal to reference light}}} \quad (8)$$

Distribution equal to reference light which matches the phase distribution of the reference light during recordal.

That is, the distribution of light reaching the point O, as shown in FIG. 13, becomes $$\exp(j \cdot K_0 \cdot \gamma_o)$$

at the time of recordal and $$\exp(j \cdot K_1 \cdot \gamma_o)$$

at the time of reproduction, so if phase modulation depending on distribution of $$\exp(j \cdot (K_0 - K_1) \cdot \gamma_o)$$

is performed with respect to $\exp(j \cdot K_1 \cdot \gamma_o)$ just before or just after the hologram plane, then $$\exp(j \cdot K_1 \cdot \gamma_o) \cdot \exp(j \cdot (K_0 - K_1) \cdot \gamma_o) = \exp(j \cdot K_0 \cdot \gamma_o)$$

and a distribution of light the same as at the recordal is obtained at the time of reproduction.

Figure 14:
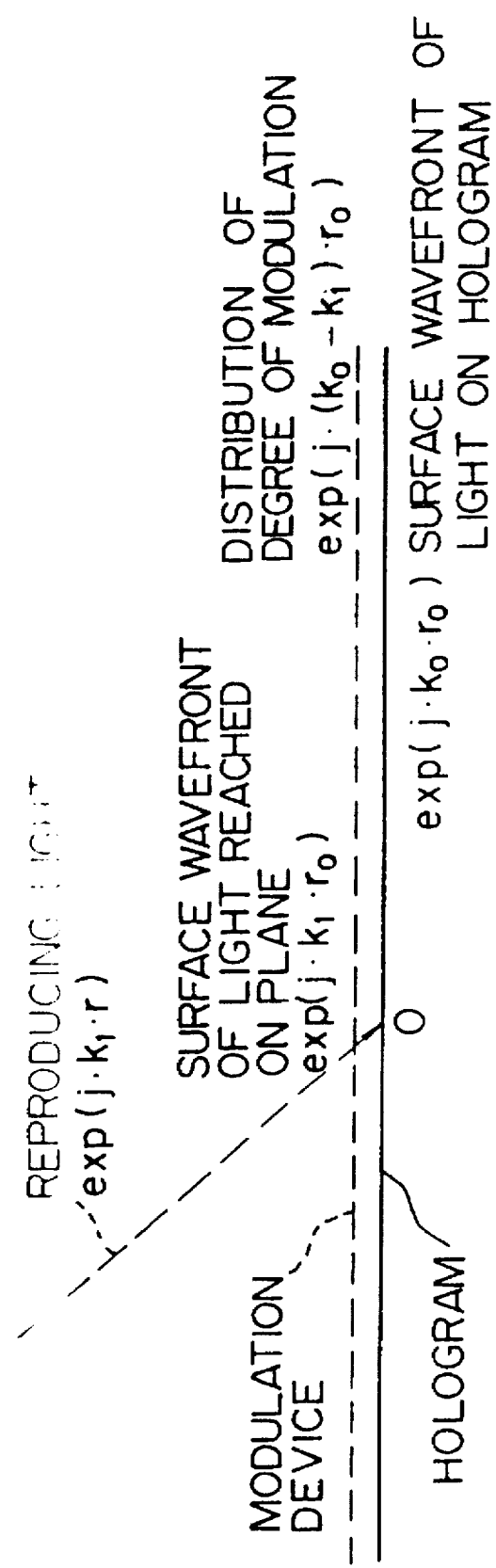
FIG. 14 is a side view showing the state of application of modulation by a device just before the hologram plane.

FIG. 14 is a side view showing the state of application of modulation by a device just before the hologram plane.

Due to the above, by displaying a hologram after applying, for the reproducing light, modulation having a distribution as shown in equation (8), found from the wave number of the reference light and the reproducing light, to the value of the phase of the data of the hologram or holographic stereoscope already found by computer etc., it is possible to reproduce a distortion free stereoscopic image no matter what the direction of the reproducing light. Due to this, not only is it possible to display data previous found using reproducing light of any angle of incidence, but also it is possible to reduce the width of the spatial area to be realized in a computer-generated holographic stereogram.

Below, an explanation will be given of a specific example of the matter shown in FIG. 13 and FIG. 14 while referring to FIG. 15, FIG. 16, and FIG. 17.

Figure 15:
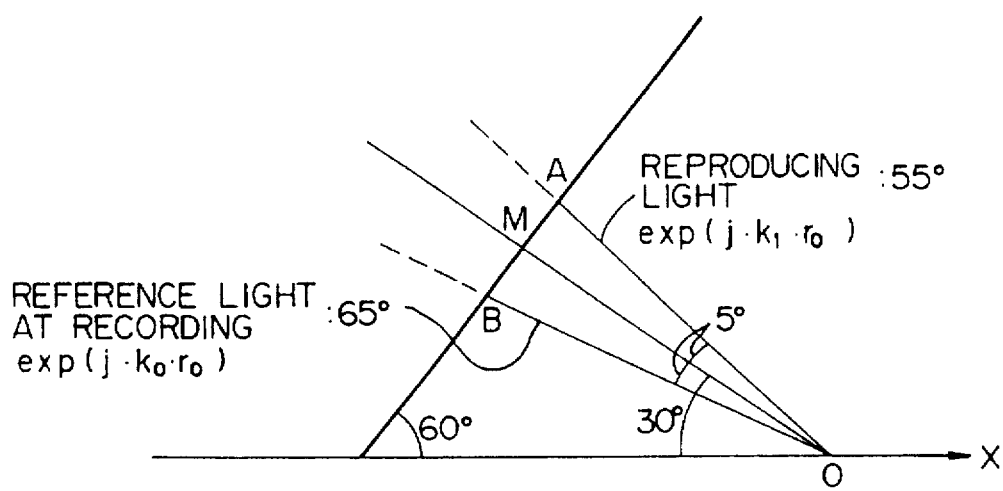
FIG. 15 is a view showing the relationship between the reference light at the time of recording and the reproducing light.
Figure 16:
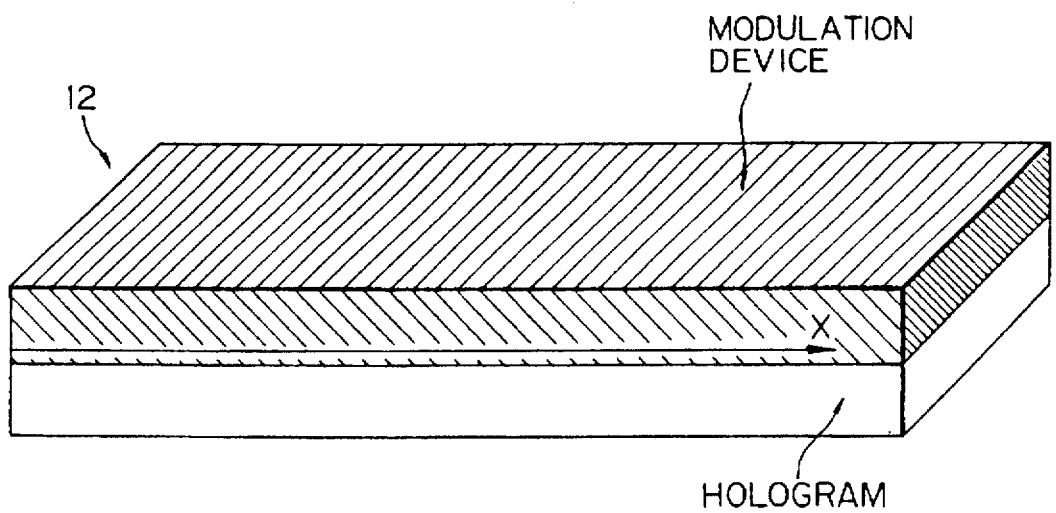
FIG. 16 is a perspective view showing the arrangement of the modulation device and hologram.

FIG. 15 is a view showing the relationship between the reference light at the time of recording and the reproducing light. FIG. 16 is a perspective view showing the arrangement of the modulation device and hologram, and FIG. 17 is a graph showing the distribution of index of refraction which the device for modulation of the index of refraction is to realize. Consider the case of the reference light and the reproducing light as shown in FIG. 15. Assume the wavelength of the coherent light source used for the hologram is 633 nm, the reference light and the reproducing light are both parallel to the plane perpendicular to the hologram plane, including the X axis defined by the hologram surface, and the angle of incidence of the reference light to the perpendicular of the X axis is 55°. In this case, the value of $$|K_0 - K_1|$$

to be found by the above equation (8) becomes $$|K_0 - K_1| \times \left( \frac{2}{90} /(6.33 \times 10^{-7}) \right) \times \sin(5°)2 = 1.73 \times 10^6 \quad (10)$$

since it is sufficient to find AB using AO and BO as the wave number vectors of the incident light. AB forms an angle of 60° with respect to the X axis, so the value positively projected on the X axis becomes $$|K_0 - K_1| \times \cos(60°) = 8.65 \times 10^5 \quad (11)$$

Figure 17:
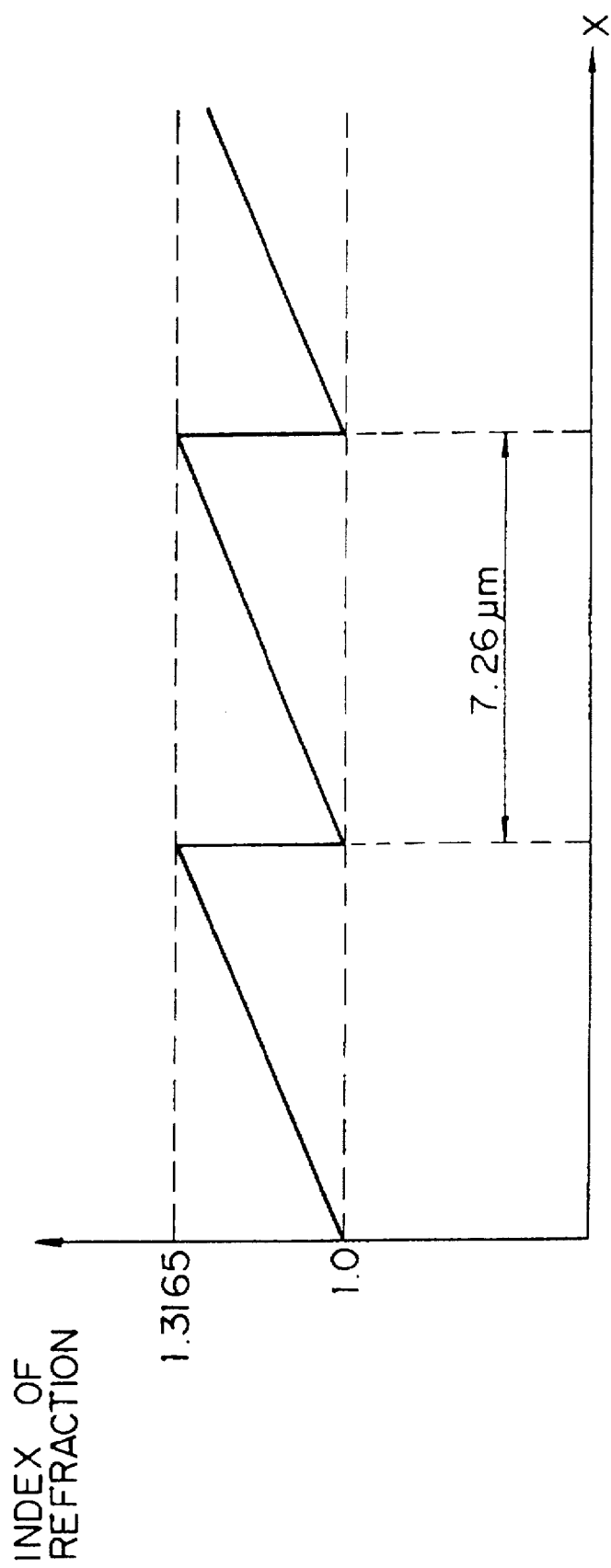
FIG. 17 is a graph showing the distribution of index of refraction which the device for modulation of the index of refraction is to realize.

That is, at a point of the coordinate x on the X axis, the phase distribution to be corrected becomes as shown for example in FIG. 17:

$$\exp(j \times (8.65 \times 10^5) \times X = \exp(j 2\pi X/(7.26 \times 10^{-6})) \quad (12)$$

This distribution may be added into the phase distribution of the hologram or holographic stereogram found by computer.

By adding the above-mentioned phase distribution compensation to a previously prepared computer-generated hologram or holographic stereogram, it is possible to reproduce a perfect stereographic image no matter what the direction of the reproducing light. Therefore, it becomes possible to ease the restrictions on the angle of incidence of the reproducing light. As the display device 12 (FIG. 5), use may be made of a device (thickness of about 2 μm) able to change the index of refraction at different points on the display screen.

As explained above, according to the present invention, since it is sufficient to deal with only amplitude modulation, there is the advantage that the drive system of the display device for reproducing the stereoscopic image can be simplified.

Further, a cosine transform corresponds to an orthogonal transform of image data, so the cosine transform coefficients concentrate at the lower order terms and therefore it becomes possible to faithfully reproduce the original stereoscopic image.

We claim:

1. A holographic stereogram, comprising an array of a plurality of element hologram means each loaded with a unique modulation value corresponding to a stereoscopic image to be reproduced, for reproducing said stereoscopic image by irradiating the element hologram means with coherent light from a light source, wherein the plurality of element hologram means are given modulation values by a drive system consisting of cosine transform coefficients obtained by one of a cosine transform and a discrete cosine transform of the distribution of intensity of diffraction light expressing the stereoscopic image to be reproduced.

2. A holographic stereogram as set forth in claim 1, wherein amplitudes are changed in accordance with the modulation values corresponding to the element hologram means to form the element hologram means in a display device.

3. A holographic stereogram as set forth in claim 2, wherein if the number of samples for each of said element hologram means is N (N being a positive integer), then an N number of said cosine transform coefficients and another N number of cosine transform coefficients which are obtained by rearranging or inverting said cosine transform coefficients are both produced over 2N modulation components and are loaded on said display device.

4. A holographic stereogram as set forth in claim 2, wherein in each element hologram means, compensation is applied in advance so that a degree of modulation of an index of refraction gradually changes along with an increase in a distance from the center.

5. A holographic stereogram as set forth in claim 4, wherein an amount of said compensation is revised in accordance with variations in the distance between the element hologram and the point of sight.

6. A holographic stereogram as set forth in claim 2, wherein the element hologram means are loaded with modulation values composed of one-dimensional cosine transform coefficients and are arranged in one direction for realization of a computer-generated one-dimensional holographic stereogram.

7. A holographic stereogram as set forth in claim 2, wherein the plurality of element hologram means are loaded with modulation values comprised of two-dimensional cosine transform coefficients and are arranged two-dimensionally for realization of a computer-generated two-dimensional holographic stereogram.

* * * * *